(12) United States Patent
Bhansali et al.

(10) Patent No.: US 7,769,974 B2
(45) Date of Patent: Aug. 3, 2010

(54) INCREASING DATA LOCALITY OF RECENTLY ACCESSED RESOURCES

(75) Inventors: Sanjay Bhansali, Sammamish, WA (US); Wen-Ke Chen, Bellevue, WA (US); Xiaofeng Gao, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 216 days.

(21) Appl. No.: 10/968,577

(22) Filed: Oct. 18, 2004

(65) Prior Publication Data

US 2006/0059474 A1 Mar. 16, 2006

Related U.S. Application Data

(60) Provisional application No. 60/608,734, filed on Sep. 10, 2004.

(51) Int. Cl.
*G06F 12/00* (2006.01)
*G06F 9/45* (2006.01)

(52) U.S. Cl. .................. 711/170; 707/819; 717/127
(58) Field of Classification Search .................. 711/170
See application file for complete search history.

(56) References Cited

U.S. PATENT DOCUMENTS

| | | | | |
|---|---|---|---|---|
| 5,640,534 A * | 6/1997 | Liu et al. | | 711/146 |
| 5,737,605 A * | 4/1998 | Cunningham et al. | | 719/312 |
| 5,930,807 A * | 7/1999 | Ebrahim et al. | | 707/206 |
| 6,480,862 B1 * | 11/2002 | Gall | | 707/3 |
| 6,510,440 B1 * | 1/2003 | Alpern et al. | | 707/206 |
| 6,594,674 B1 * | 7/2003 | Kaplan et al. | | 707/104.1 |
| 6,618,792 B1 * | 9/2003 | Perrin et al. | | 711/122 |
| 2001/0016792 A1 * | 8/2001 | Matsuo | | 701/35 |
| 2004/0133895 A1 * | 7/2004 | Dahlstedt et al. | | 719/310 |
| 2005/0102657 A1 * | 5/2005 | Lewis | | 717/140 |
| 2005/0114413 A1 * | 5/2005 | Subramoney et al. | | 707/206 |
| 2005/0149585 A1 * | 7/2005 | Bacon et al. | | 707/205 |
| 2005/0204349 A1 * | 9/2005 | Lewis et al. | | 717/162 |
| 2006/0143421 A1 * | 6/2006 | Subramoney et al. | | 711/170 |

FOREIGN PATENT DOCUMENTS

| | | |
|---|---|---|
| EP | 1 104 897 A2 | 10/2000 |
| EP | 1 387 273 A2 | 2/2004 |

OTHER PUBLICATIONS

Adl-Tabatabai et al., *Prefetch Injection Based on Hardware Monitoring and Object Metadata*, ACM Conference on Programming Language Design and Implementation (PLDI), Jun. 2004, 73 pages.

(Continued)

*Primary Examiner*—Sheng-Jen Tsai
*Assistant Examiner*—Kaushikkumar Patel
(74) *Attorney, Agent, or Firm*—Klarquist Sparkman, LLP

(57) ABSTRACT

Applications written in modern garbage collected languages like C# tend to have large dynamic working sets and poor data locality and are therefore likely to spend excess time on managing data movements between memory hierarchies. Instead, a low overhead dynamic technology improves data locality of applications. The technology monitors objects while the program runs and places recently accessed objects on the same page(s) on the heap. Providing increased page density is an effective method for reducing DTLB and/or data cache misses.

28 Claims, 8 Drawing Sheets

OTHER PUBLICATIONS

Arnold et al., *A Framework for Reducing the Cost of Instrumented Code*, ACM Conference on Programming Language Design and Implementation (PLDI), Jun. 2001, pp. 168-179.

Cheney, *A Nonrecursive List Compacting Algorithm*, Communications of the ACM, vol. 13, No. 11, Nov. 1970, pp. 677-678.

Chilimbi et al., *Cache-Conscious Structure Layout*, Proceedings of the ACM SIGPLAN '99 Conference on Programming Language Design and Implementation, May 1999, 12 pages.

Chilimbi et al., *Dynamic Hot Data Stream Prefetching for General-Purpose Programs*, ACM Conference on Programming Language Design and Implementation (PLDI), Jun. 2002, 11 pages.

Chilimbi et al., *Using Generational Garbage Collection to Implement Cache-Conscious Data Placement*, International Symposium on Memory Management (ISMM '98), Oct. 1998, 12 pages.

Courts, *Improving Locality of Reference in a Garbage-Collecting Memory Management System*, Communications of the ACM, Sep. 1988, vol. 31, No. 9, pp. 1128-1138.

Hirzel, *Connectivity-Based Garbage Collection*, Thesis submitted to the Faculty of the Graduate School of Colorado, 2004, pp. 1-203.

Huang et al., *The Garbage Collection Advantage: Improving Program Locality*, OOPSLA '04, Oct. 24-28, 2004, Vancouver, British Columbia, Canada, 12 pages.

Inagaki et al., *Stride Prefetching by Dynamically Inspecting Objects*, ACM Conference on Programming Language Design and Implementation (PLDI), Jun. 2003, pp. 269-277.

Lam et al., *Object Type Directed Garbage Collection to Improve Locality*, Bekkers and Cohen, 1992, pp. 404-425.

Moon, *Garbage Collection in a Large Lisp System*, 1984 ACM Symposium on Lisp and Functional Programming, pp. 235-246.

Shuf et al., *Creating and Preserving Locality of Java Applications at Allocation and Garbage Collection Times*, OOPSLA 2002, 12 pages.

White, *Address/Memory Management for a Gigantic LISP Environment or, GC Considered Harmful*, Jul. 1980, pp. 119-127.

Wilson et al., *Dynamic Storage Allocation: A Survey and Critical Review*, Proc. 1995 Int'l Workshop on Memory Management, Sep. 1995, Springer Verlag, pp. 1-78.

Wilson et al., *Effective "Static-graph" Reorganization to Improve Locality in Garbage-Collected Systems*, Proceedings of the ACM SIGPLAN '91 Conference on Programming Language Design and Implementation, Jun. 26-28, 1991, Toronto, Ontario, Canada, pp. 177-191.

European Search Report for EP 05 10 8006, dated Feb. 2, 2009, 8 pages.

\* cited by examiner

INCREASING DATA LOCALITY OF RECENTLY ACCESSED RESOURCES

RELATED APPLICATIONS

This application claims benefit to U.S. Provisional Application No. 60/608,734, filed on Sep. 10, 2004, which is incorporated herein by reference.

TECHNICAL FIELD

The technical field relates generally to managing memory to increase data access efficiency, and more specifically, to monitoring and rearranging recently accessed objects in order to improve data locality on an automatically managed heap.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The growing disparity between processor speeds and memory is well known. Many applications are written in languages that execute in environments that perform memory management techniques such as garbage collection. Such languages include but are not limited to languages such as C# and Java. Applications written in these languages tend to have large dynamic working memory page sets with poor data locality. Poor data locality can cause applications to perform poorly and will not scale well as processor speeds increase.

Larger and multi-level caches help hide memory latency to a certain extent. However, cache memory is expensive and on-chip caches (e.g., L1 cache, ITLB cache, and DTLB cache) are not likely to grow at the same rate as workloads of modern applications due to this expense. Further, prefetching techniques in hardware can sometimes reduce memory latencies, but prefetching for irregular data accesses is difficult when serial dependencies (e.g., pointer indirection) preclude timely materialization of prefetch addresses.

Consequently, there has been interest in improving data locality of applications using software techniques. Both static and dynamic techniques have been investigated and reported in recent literature. Static techniques rely on ahead-of-time program analysis, typically using profile data to co-locate objects based on reference locality, or inject prefetch instructions at compile time to hide memory latencies. The main advantage of these approaches is that there is no runtime overhead; however, they may suffer from the usual limitations of static approaches (e.g., difficulty of handling dynamic loaded assemblies and classes, cost of whole program analysis for just-in-time compilers, and difficulty in dealing with changing phases of a program). Some of the garbage collection (GC) based systems employed a copying mechanism to reorganize allocated objects at runtime whether or not they were recently accessed. However, GC has been utilized primarily for reclaiming memory, and better spatial locality has been achieved passively as a side effect of compacting or reorganizing the heap with the primary goal of reclaiming space.

Other GC-based approaches also use instrumentation to collect profile information at run time but the profiling costs of these techniques have been too heavy.

SUMMARY

The described technologies provide methods and systems for enhancing memory management such as garbage collection to increase data locality. The problems noted above are addressed, at least in part, by the systems and methods disclosed herein. In one example, a low overhead technique gathers heap access information which is then utilized to guide the heap reorganization to achieve better data access locality for applications in a garbage collection (GC) based system. The profiling and heap reorganization focus on improving page density to create a practical implementation that is inexpensive and yet effective in reducing both page faults and cache misses.

In one example, a GC is utilized primarily and proactively for improving memory locality, and not merely as a mechanism to reclaim free memory space passively as in the past. In one such example, a GC for locality is invoked or triggered upon detection of certain program behavior or performance, even when there is still space for new allocations and therefore a GC for space would not otherwise be triggered. In one such example, triggering the GC for locality can increase the number of garbage collections substantially (e.g., by 50% over the number of collections that would otherwise be required for collecting freed memory space), and yet still result in an overall speedup because of improved locality.

In one example, the method is implemented using the Common Language Runtime (CLR) of Microsoft's .Net Framework. The CLR uses a just-in-time (JIT) compiler to translate MSIL (Microsoft Intermediate Language) binaries to native code and employs a generational garbage collector to manage the heap. An example method for improving data locality via garbage collection is evaluated on several exemplary applications written in C#; however, the methods are applicable to applications written in any language targeting for copying GC-based systems. However, garbage collection is not required by the described technologies.

In another example, a method monitors objects accessed on the heap. In one such example, one or more bits are set (or counted) to indicate that an object was accessed. The one or more bits may be within or near the object itself or elsewhere in memory. In another example, not all accesses are counted. Instead, the method periodically monitors accessed objects for a sampling period. In one such example, the method also monitors program behavior in order to determine when to perform a heap reorganization. When a monitored program behavior indicates, the method reorganizes the heap. In one example, the reorganization clusters recently accessed objects in the same area of the heap. In another example, the reorganization clusters objects recently accessed during a sampling period in the same area of the heap. In one example, a cluster of recently accessed objects are placed on one or more pages of the heap. In another example, the method clears the bits that indicate that an object was accessed, and returns to monitoring objects accesses and program behavior.

Additional features and advantages will be made apparent from the following detailed description, which proceeds with reference to the accompanying drawings.

DETAILED DESCRIPTION

Exemplary Method of Optimizing Data Locality

Figure 1:
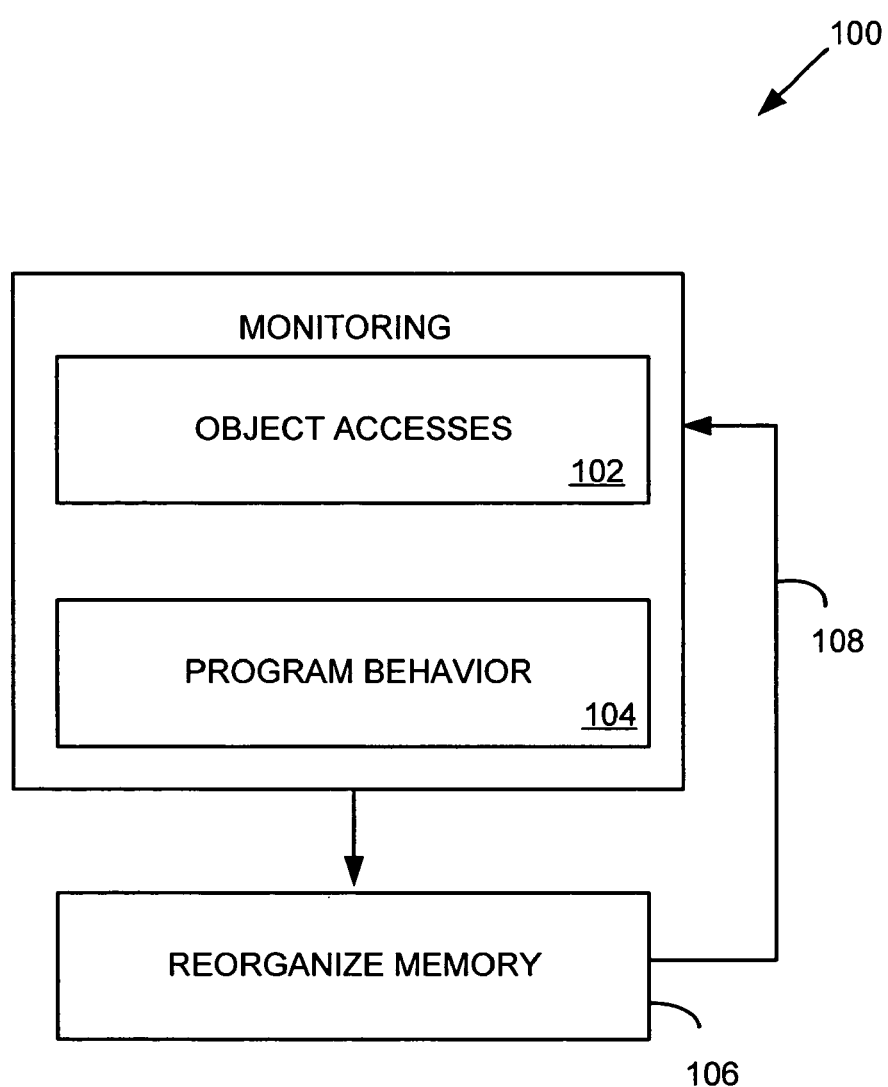
FIG. 1 is a flowchart for an exemplary method for optimizing data locality of the heap.

FIG. 1 is a flowchart for an exemplary method for optimizing data locality of the heap. As shown, the method 100 monitors accessed objects, monitors optimization metrics, and reorganizes accessed objects on a heap page(s).

At 102, the method monitors objects accessed on the heap. For example a JIT compiler instruments operations that read or write data objects in the heap. A record is kept indicating what objects are accessed. In one example, the record is a bit in the object itself that is set to indicate that the object was accessed recently. In another example, the record is a bit in a separate bit vector. In yet another example, the processor provides a mechanism or instructions that record the addresses of all objects accessed recently (for example, recording all addresses that are currently in cache) or addresses that caused a page fault.

Meanwhile, at 104, the method monitors metrics in order to determine when to perform optimization for data locality. For example, a performance metric could be an object allocation rate, a DTLB miss rate, a cache miss rate, a performance counter, an object reference counter, or a timer. When a monitored metric indicates that it is time to reorganize the heap for locality, the method performs step 106.

At 106, the method first identifies recently accessed objects and then congregates them on contiguous pages in the heap. For example, instrumented code set a bit in accessed objects or in an accessed object bit table. For example, if instrumented code set bit(s) in accessed objects or in an accessed object bit table, then these objects are clustered together on the heap. In another example, an operation provided by the processor tells what object addresses were accessed on the heap. In another example, an operation provided by the processor indicates what address requests caused DTLB misses. In one example, access bits or counters corresponding to accessed objects are then reset. In another example, the access bits or counters are not immediately reset, but are reset slowly over time.

At 108, the method returns to steps 102 and 104 once the heap has been optimized for data locality.

Exemplary System for Optimizing Data Locality

Figure 2:
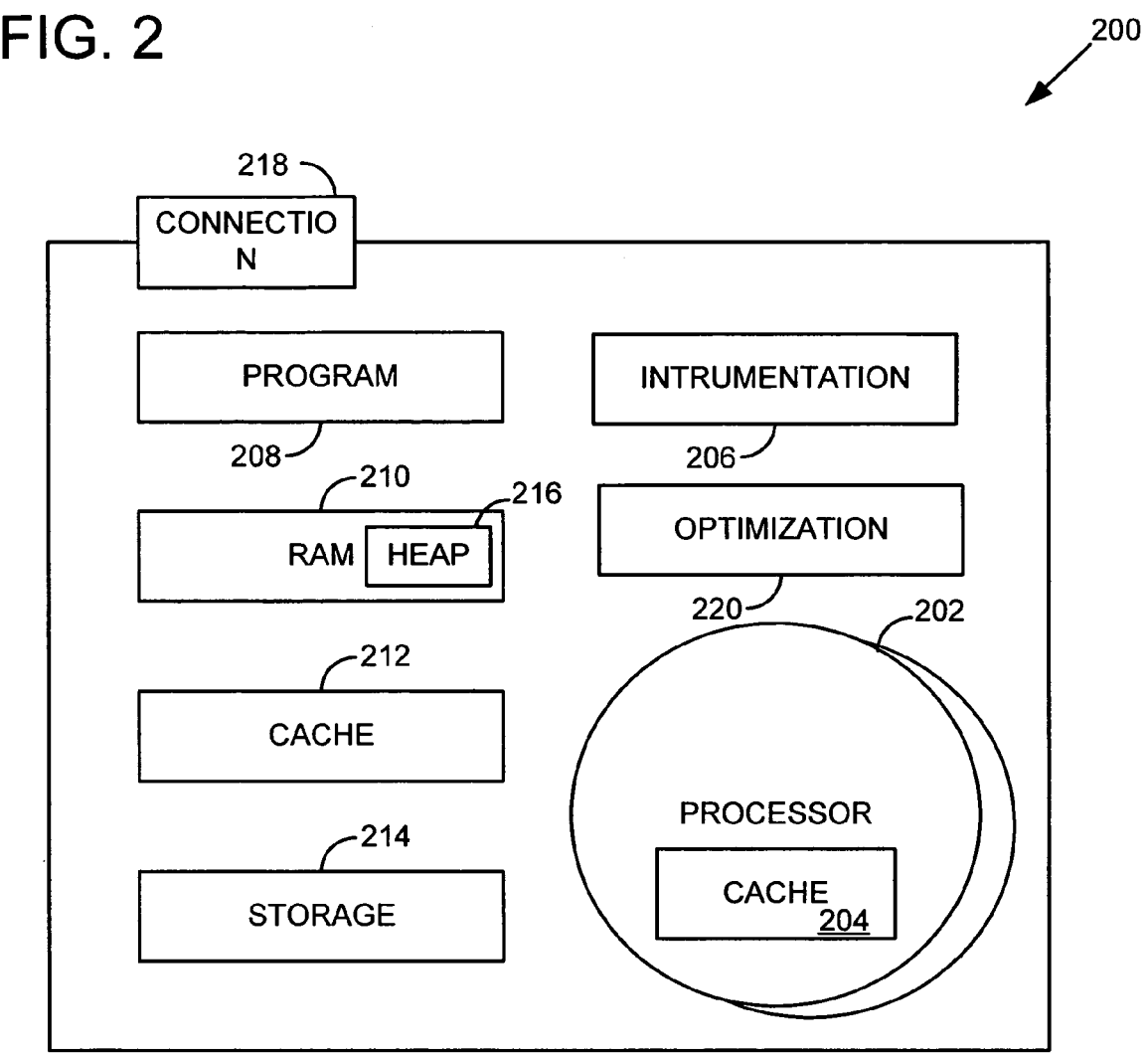
FIG. 2 is a block diagram of an exemplary system for optimizing data locality of the heap.

FIG. 2 is a block diagram of an exemplary system for optimizing data locality of the heap.

The computer system 200 includes one or more processors 202, on-chip cache 204, a running program(s) 208 being monitored and optimized for data locality, a module 206 for monitoring programs for improved data locality, a random access memory (RAM) 210 comprising a heap 216 of working data pages (e.g., pages, segments, etc.) for the running program 208, off-chip cache 212, a disk drive or other binary storage device 214, and a network connection 218. The processor(s) execute programs 208, 206, 220, which include instructions, data, and/or state. As the monitored program 208 executes, data pages of the program are brought back into the heap 216 from storage 214 and or the network 218 as needed.

In one example, a monitored program 208 is intermediate language (IL) code that is further compiled into native code before execution. In such a case, a compiler 206 compiles and instruments the program. In another example, the program is already in native binary form, and instrumentation is performed 206 on the native binary code. In another example, the instrumentation 206 adds instructions supported by the processor for identifying objects or addresses accessed during execution.

The program 208 is instrumented so that it records objects in the heap 216 that are accessed while the program 208 executes. The program is also instrumented so that it monitors metrics and triggers an optimization module 220. Various metrics may be used to trigger optimization such as TLB, DTLB, or cache misses. Other possible metrics for triggering optimization are memory allocation rates, object reference counts, along with others discussed below. Once the instrumented program executes, and an optimization is triggered, the optimization module 220 reorganizes at least one memory page (or segment) of the heap 216. For example, the optimization places all accessed objects (e.g., hot objects) on a single page (or a set of pages) on the heap. This page (or set of pages) of hot objects on the heap is called a hot page(s).

Thus, the system instruments a program to monitor objects accessed during execution (program monitoring), monitors the program for performance indicators that trigger heap 220 optimization (performance monitoring), and reorganizes the accessed objects into a cluster (e.g., one or more groupings of objects near each other on the heap, onto a single page, onto contiguous page(s), etc.) in memory in order to increase program performance due to increased data locality (data locality optimization). Additionally, once data is optimized for locality, the system begins monitoring the optimized program. Thus, the system is dynamic and ongoing.

Exemplary Memory Configurations

Figure 3:
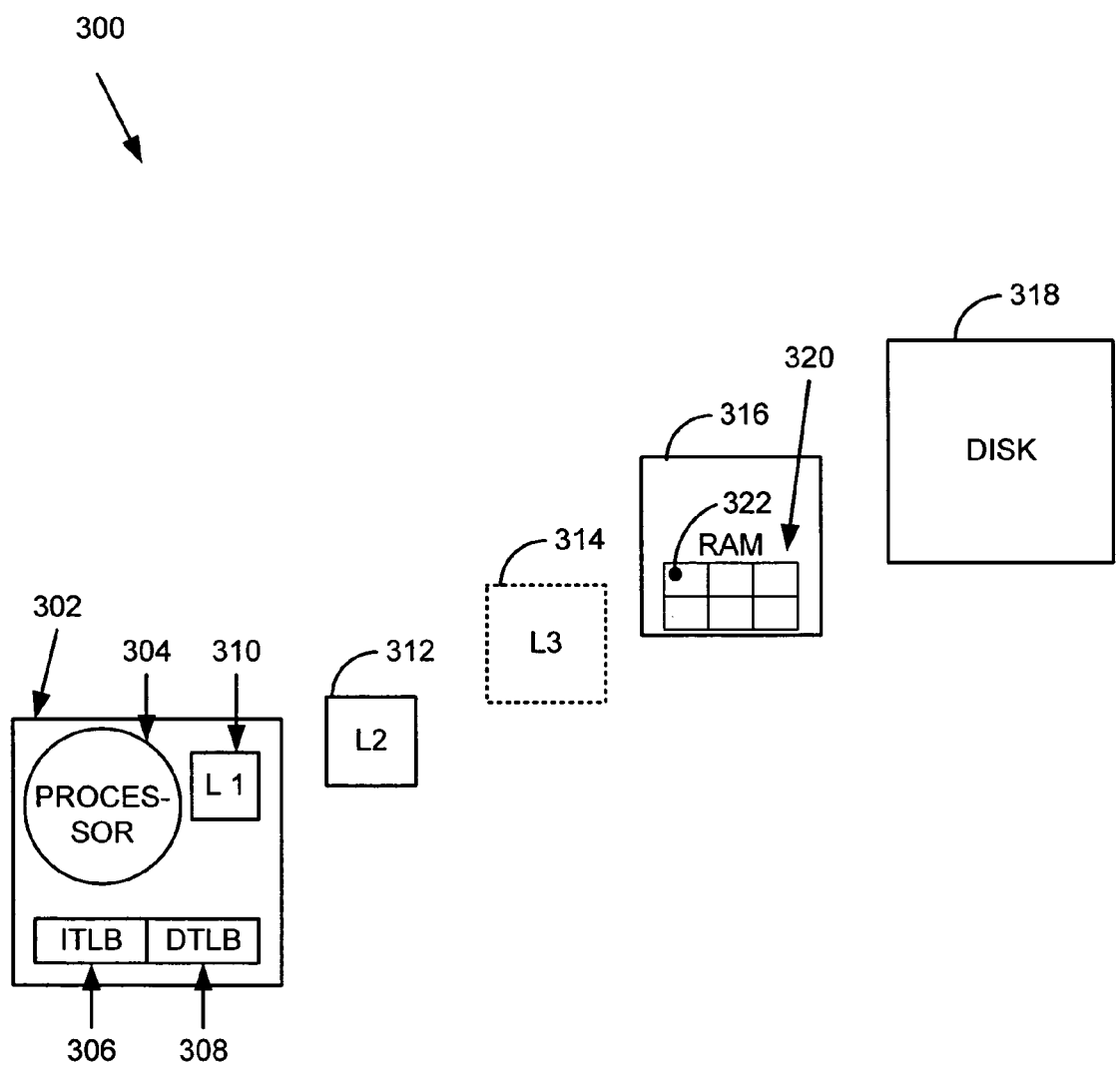
FIG. 3 is a block diagram of an exemplary system for managing memory via multiple levels with varying access speeds.

FIG. 3 is a block diagram of an exemplary system for managing memory via multiple levels with varying access speeds.

Modern computers 300 include a central processing unit(s) 302 (CPU), which include processor(s) 304 and various levels of memory including but not limited to on-chip cache 306, 308, 310, off-chip cache 312, 314, random access memory (RAM) 316, disk storage 318 and many other forms of memory. Computers execute programs that have been processed into executable files. The processor fetches the instructions from memory, decodes the instructions, and executes the decoded instructions to perform various functions. To improve performance and speed, computers use various levels of memory to increase the likelihood that a next instruction or data will be available when needed. For example, instead of looking in RAM every time data or instructions (i.e., resources) are needed, the processor checks to see whether the resources are in cache. Obtaining a needed resource from cache is faster than obtaining it from RAM or disk because it can be accomplished in fewer clock cycles.

Computers often are designed to provide separate caches for instructions and data. The described methods and systems improve computing performance by reducing the time required to retrieve resources.

CPU performance has been increasing much faster than memory performance. This has resulted in the situation where programs are not running much faster as processor speeds increase. One solution has been to build larger cache memory closer to the chip, but that solution is troublesome since cache memory is expensive. So the relative speed of processing has been dominated more by the speed of memory than the speed of decoding and executing instructions. This is evident for example, when a Pentium IV is three or four times faster but the applications do not run three times faster because the processor is waiting for data or instructions to arrive from memory. Time is spent translating the virtual address into the physical address in memory which is done by translation look-aside buffers (TLB) 306, 308. Many systems have a look-aside buffer for instructions (ITLB) 306, and a look-aside buffer for data (DTLB) 308. Since programs can have a virtual address space that is larger than the available space in RAM, portions of the programs execution state (e.g., code/data pages) are transported between RAM 316 and storage 318 as needed.

The TLB is used to translate what is presently available in virtual address space to where it is located in physical memory. TLB cache is expensive hardware, so designers prefer to keep the size smaller. The TLB is a map of what portion of the larger program state is in memory 316. When the program execution requests an address that is not in RAM 316 as determined by the TLB cache, it encounters a page fault. If the page containing the address is resident in memory then the page fault is called a soft page fault and it takes a few hundred cycles to update the TLB entry for that address. If the page containing that address is not resident in memory, then it must be brought into memory from storage. In this case, the page fault is called a hard page fault and it can take millions of instructions to bring the page from disk. When the processor requests an address that is already available in both the TLB and the cache 310, 312, 314, then the translation is very fast. Thus, memory management involves among other things, managing what pages (blocks, segments, etc.) are available, and how to increase the likelihood that a needed resource will be available to the processor in the fewest number of clock cycles.

Merely for relative comparison of time distinctions, it is interesting to look at examples of various cache and memory speeds. If a resource requested by the processor is available in level one (L1) cache, the resource can be obtained in 1-3 clock cycles. If a resource requested by the processor is available in L2 cache, the resource can be obtained in 10-50 clock cycles. Resources in L3 cache can be obtained in about 20-100 clock cycles, resources in memory can be obtained in about 500 clock cycles, and resources in storage take significantly longer to obtained. Resources are brought into memory from storage in pages (e.g., 4 K bytes) as needed, and smaller sizes such as blocks are brought into cache as needed (e.g., 64-128 bytes). Again, these examples do not control or limit the discussion in the context of evolving real or relative differences now or in the future, they merely are intended to give context to the discussion.

Thus, the system instruments a program to monitor objects accessed during execution (program monitoring), monitors the program for performance indicators that trigger heap 320 optimization (performance monitoring), and reorganizes the accessed objects onto a single page(s) 322 in memory in order to increase program performance due to improved data locality (data locality optimization). Additionally, once data is optimized for locality, the system begins monitoring the optimized program. Thus, the system is dynamic and ongoing.

Exemplary Compilation

Figure 4:
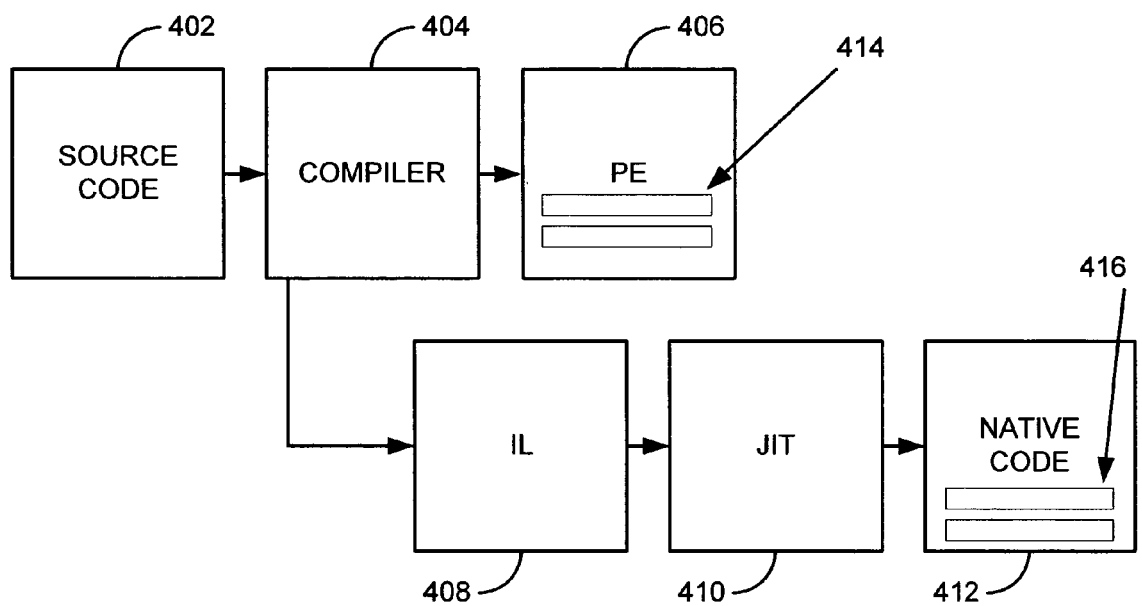
FIG. 4 is a diagram of exemplary methods of creating executable code for performing optimization.

FIG. 4 is a diagram of exemplary methods 400 of creating executable code. In one example, source code 402 is compiled 404 and distributed in executable form 406 (e.g. X86) and brought into memory as needed. For example, some code binaries can be run in any compatible environment. In one such example, the compatible binary code is a portable executable (PE) that can be executed in any X86 environment. This model is found in programs written in high-level programming languages such as C and C++.

In another example, source code 402 is compiled 404 into intermediate level code 408 (e.g., MSIL, Java, etc.), that can be further compiled 410 into native executable 412 for the processor where it will execute (e.g., x86, x64, etc.). In one such example, a just-in-time (JIT) compiler translates the intermediate code to native code when needed for execution (e.g., when brought into memory from storage, the network, etc).

Memory management, including garbage collection, is employed in many computing environments including those contemplated by FIG. 4, and a single computing environment can employ any of these methods of compilation. For example, existing binaries can be instrumented 414 to record what objects are accessed during execution, as well as instrumented 416 during JIT compilation. Interestingly, the locality optimizations described herein tend to be especially useful in JIT compilation because often these languages rely more heavily on memory management to clean-up objects that are no longer referenced by programs (e.g., via reachability analysis, reference counts, etc).

Some high level languages require a programmer to allocate and de-allocate memory that their program is expected to need. Other languages or runtimes allow the programmer to rely on garbage collection to do the de-allocation. A garbage collection involves identifying in the heap what objects are still in use and discarding any objects that are no longer referenced.

Historically, garbage collectors were invoked when there is not enough space to meet new allocation requests, and space occupied by objects that were determined to be no longer referenced were freed and made available for new objects. Thus, GC was viewed primarily as a way of reclaiming memory as needed. For example, when a program needs more memory than is presently available, the heap is traversed to find out what memory is reachable on the heap. Reachable memory was packed onto pages, and freed space was made available for resources requested by the processor. Thus, GC was triggered only when new allocation requests could not be satisfied.

In the present technology, GC is viewed as a way of improving the locality of data, and thereby improving performance. In one such example, GC is viewed primarily as improving locality for performance, and secondarily for freeing memory as needed. GC often results in improved performance despite the overhead of tracking hot objects and arranging the accessed objects together. In one example, even though GC was performed 50% more times than it would have been performed merely for reclaiming space, the net performance was still better. Because the hot objects are packed onto a page(s), there is increased likelihood that portions of the packed hot page moved into cache will also be needed by the processor. Thus packing objects onto a page or set of pages increases spatial locality not only on the heap but also in cache where portions of that page are placed. A side effect of packing a page with hot objects is an increased utilization of cache.

Interestingly, setting a bit for each object accessed, is good enough for tracking accessed objects. However, counting touches using several bits per object indicates what objects are touched most often. This allows greater granularity in where objects are packed on a page(s).

Exemplary Locality

It is well-known that applications tend to exhibit temporal locality in accessing memory, namely an object will be accessed again in the near future if it was accessed recently. In addition, if an application accesses objects close to the objects it has recently accessed, it is said to have good spatial locality. Poor spatial locality will cause object accesses spread all over the memory, resulting in low utilization of the TLBs/caches and RAM and thus low performance of execution. By monitoring what objects are most recently touched and invoking an optimization method to collocate these hot objects, spatial locality will likely be improved in later phases of the execution. Given that the set of hot objects may change while a program operates, it is important to continue monitoring and optimizing continuously, or periodically.

It is not required that this memory optimization technique be invoked during garbage collection or from garbage collection. In one embodiment, a locality optimization collection operates separately from garbage collection. In one such example, memory pressure causes an existing garbage collection method to free memory, but the locality optimization is invoked whenever necessary as described herein.

In another example, the locality optimization method is provided as an additional optimization of garbage collection, which is convenient since the existing methods and data structures managing the heap can be used to support locality optimization. For example, during a garbage collection while live objects are identified, live and hot objects can be recognized as well and packed in the hot page(s).

Figure 5:
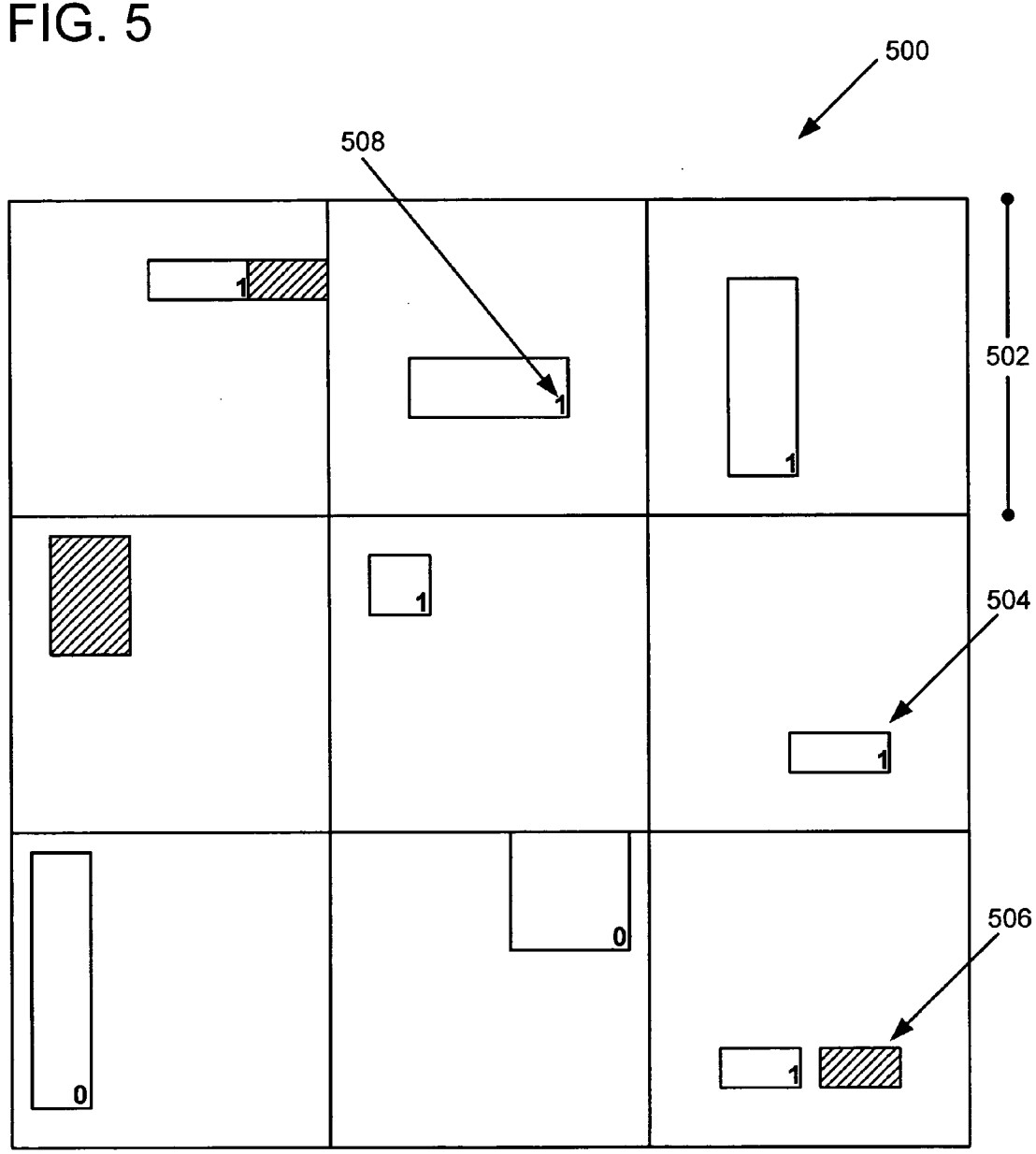
FIG. 5 is an exemplary diagram illustrating exemplary objects spread throughout pages in memory for performing optimization.

FIG. 5 is an exemplary diagram illustrating exemplary objects spread throughout pages in memory. In this example, each grid 502 denotes a page on a heap 500 and objects within grids denote live objects 504 or discarded (e.g., released or no longer referenced) objects 506. The heap typically occupies a portion of RAM. At any given moment, parts of the heap are available in faster cache memory, based on the size of the available cache. The TLB maps the virtual address space to physical addresses and indicates what portions of the virtual address space can be quickly translated to physical address in RAM.

Over time, active objects spread all over the heap, and to make things worse, the memory becomes more fragmented with dead objects in between live objects. This results in poor spatial locality. One of the side effects of this poor data locality is that more time needs to be spent moving blocks of memory in and out of cache as needed by the processor and updating the DTLB when an address is accessed that is not present in the DTLB entries.

Eventually, as the heap fills with objects, and more object allocations are requested, a garbage collection method is triggered based on memory pressures.

In one example, in order to overcome this poor data locality, a bit is set 508 in each object accessed. When the locality optimization is triggered, these objects with set bits are collected onto a single set of contiguous pages in memory. In another example, a hot bit table outside the objects indicates what objects were accessed. Either way, this hot bit data indicates what objects to place on hot pages.

Exemplary Locality Optimization Supported by Garbage Collection

Figure 6:
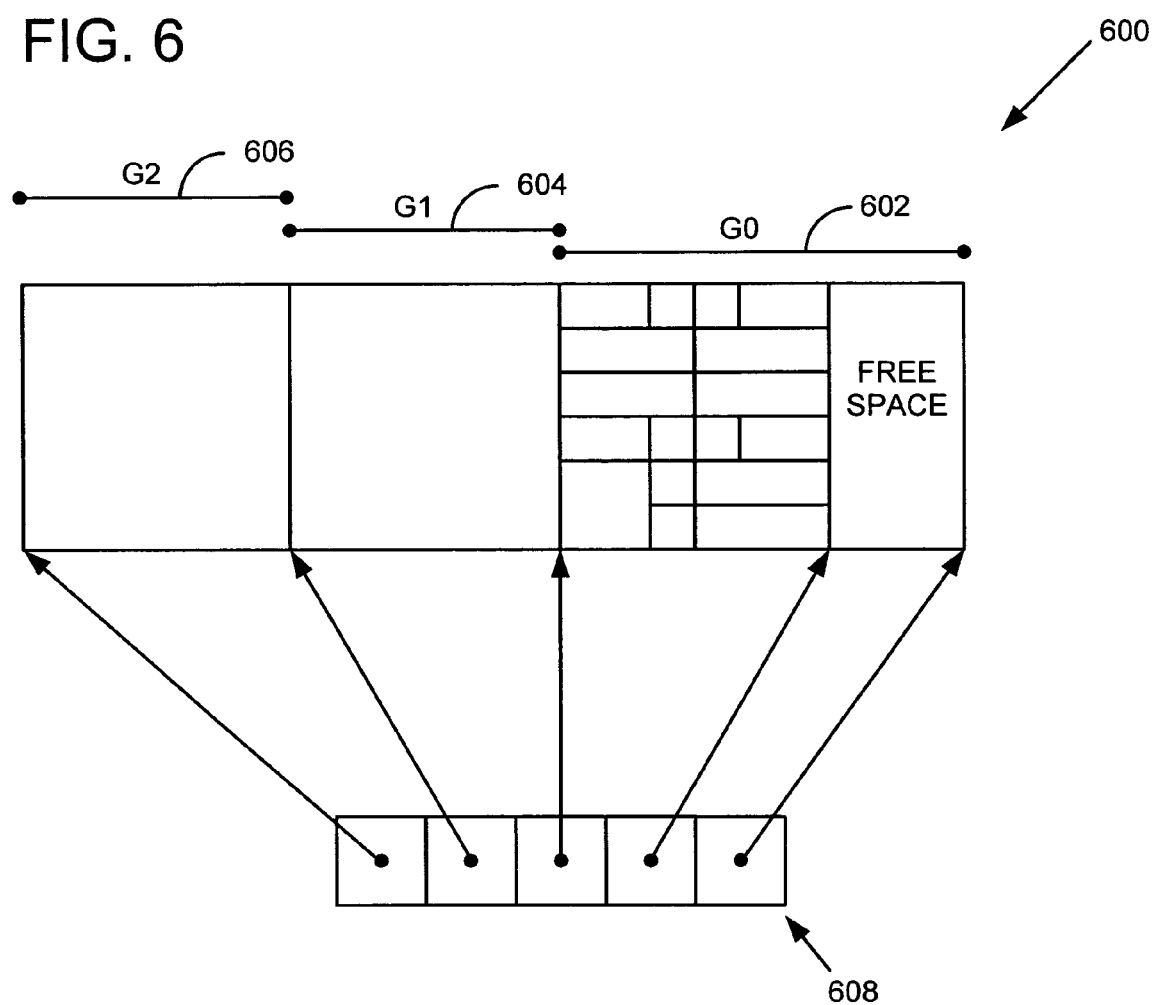
FIG. 6 is a diagram of an exemplary generational garbage collection method and system.

FIG. 6 is a diagram of an exemplary generational garbage collection method and system. The heap 600 is logically divided into generations (e.g., G0, G1, and G2). These generations are logically viewed as portions of the heap, and often three generations are used to divide the heap. For example, there is a youngest generation 602 of objects most recently allocated along with free space, an older generation of objects 604, and a generation of oldest objects 606. Typically, these objects are viewed in terms of time from original allocation, where the youngest objects and the available free space are logically viewed in the first generation 602. The logical view of the heap is stored in a data structure that indicates generation boundaries 608, along with an indication of where free space begins.

As the free space is reduced due to new allocations, garbage collection is triggered based on memory pressure (e.g., the actual or anticipated need for more memory space). For example, when an object allocation is requested and the available memory is too small or the available memory has fallen below some preferred or desirable threshold.

During memory pressured garbage collection live objects are identified, and garbage is collected (e.g., objects no longer reachable, objects no longer referenced, etc) and removed from the heap, and the size of the generations are adjusted as the freed memory is logically moved to the youngest generation.

For example, the first generation 602 may be garbage collected several times. When a memory collection of a younger generation no longer produces a desirable threshold of free memory, an older generation can be garbage collected 604. For example, when a triggered garbage collection of the first generation no longer produces enough free memory, it will trigger a garbage collection of the second generation. Several garbage collections of the second generation may occur before any garbage collection of the third generation. Once a first and second generation garbage collection does not collect enough free memory, a garbage collection of the third generation is triggered. Over time, dead objects are removed and the live objects are compacted.

There are various garbage collection methods such as "mark and sweep", where dead objects are placed on a free list and "mark and compact" where live objects are compacted together in the heap. Any of these garbage collection methods (along with variations therefrom, combinations thereof, and improvements thereto) can be adapted or enhanced to support the locality optimizations described herein once a skilled artisan has read this specification.

One of the side effects of these existing garbage collection techniques (e.g., generational garbage collection) is to improve data locality somewhat. For example, simply by removing dead objects from the heap (regardless of what generation they are removed from), increases the likelihood that pages will provide better spatial locality. The discussion will pursue copying generational garbage collection merely for purposes of illustration.

The net effect of copying generational garbage collection is that objects are kept on the heap in the approximate order of allocation, with further logical divisions grouped by generations which can be adjusted using various methods over time. A dead object is removed and subsequent live objects are moved up. Thus, the order of allocation will be maintained.

This is based on the theory that the order of allocation provides the best locality, which is not always true.

For example, Chilimbi, et al, "Using Generational Garbage Collection to Implement Cache Conscious Data Placement," October 1998 (Chilimbi), focused on placing data in a cache-friendly way in order to increase program efficiency. For example, Chilimbi monitored object sequence orders to determine in what order objects should be assembled together. This concept required monitoring the order in which objects were accessed, and attempting to rearrange these objects in that order. The overhead of obtaining all this information and analyzing this information at runtime was often cost prohibitive.

Instead, the described optimization monitors what objects are touched between optimizations or during an interval, and packs these objects on a hot page(s) on the heap when the optimization is triggered. Interestingly, although there is no direct attempt to collect profiling data for improving cache utilization, one of the side effects of placing hot objects in the way described herein on the same page(s) of the heap is that the cache ends up being utilized more wisely.

Thus, a copying generational garbage collector was an interesting environment to adapt to the optimizations discussed herein. It traverses objects to identify all live objects and then compacts them based on their allocation order, which can be taken advantage of to identify hot objects and then pack them together in the desired order. So, these optimizations are not limited by copying generational garbage collection, but are easily supported by it.

Exemplary Low Overhead Profiling

In one example, a JIT compiler was modified to instrument operations that access the heap. The instrumented code monitors when objects on the heap are touched. In one example, an area of memory is introduced (e.g., appended to) within each object to indicate whether the object was touched. In another example, a known unused area of memory (e.g., a bit, or bits) within each object is marked to show the object was touched. For example, an object header has available space that can be used for various reasons. A bit is set, or a touch is counted if multiple bits are used, and objects touched between optimization or during an interval are packed on a hot page(s). This method is often of low overhead. Additionally, as touched objects are packed on a page(s), the touched bit(s) (or bit-counter) is cleared so that they are ready to record whether or not they will be touched (or touches are counted from zero) for the next hot object collection. However, placing hot object indication bits in the header is not required. The bit(s) can be placed anywhere in the object or elsewhere. Note that there is no sequence information needed to be recorded here.

For example, a hot object bit table would denote one bit for each object. This would require more memory, but it may be better in many examples since the bits could be more easily cleared after the hot objects are identified.

In another example, a bit vector is created that is a smaller version of the heap. In one such example, bits in the bit vector correspond to addresses or areas of the heap, and a bit in the vector is set to indicate that an address or area of the heap was accessed. The bit vector can be easily reset, for example, between hot page optimizations, or when garbage collection for memory pressure is performed.

As a program evolves over time, hot objects evolve, and the hot page(s) evolves as the hot objects evolve. The low overhead profiling described herein allows dynamically changing the hot page(s) to increase program performance.

Exemplary Packed Objects Page

As will be discussed later, one or more metrics, alone or in combination may be used to determine when to trigger the locality optimization (e.g., allocation rates, performance metrics, etc). Once optimization for data locality is triggered, live objects with corresponding bit(s) indicating they are hot, are identified and placed on the hot page(s). In another example there are plural pages of hot objects. In one implementation, all hot objects are first copied out of the heap and assembled into a temporary buffer to allow traditional garbage collection for space to proceed as usual, then the assemblage of all hot objects is placed at the younger end of the heap, where newly allocated objects will be placed near these hot live objects. This implementation increases data locality greatly with very low overhead.

Exemplary Optimization of Packed Objects Page

In another example, when hot objects are encountered (e.g., as indicated by set bits) during GC for locality, the hot objects are evaluated to see what other hot objects they point to. In one such example, when a hot object points to another hot object, then not only are both hot objects placed on the hot page(s), but they are placed near each other. This provides a lower overhead way of increasing the likelihood that when portions of the hot page are moved into cache, the objects moved into cache will likely be referenced one after another. This will often provide efficient performance.

Exemplary Programs with Poor Data Locality

Below Table A shows the page density of four test applications written in C#. These numbers were obtained by running these applications using a dynamic translator and logging memory reads and writes. The numbers do not include references to stack pages. The density metric is equal to the numbers of unique bytes read or written on a page divided by the size of the page. In this example, an interval is set at $10^6$ references. Below Table A illustrates that data pages are used very ineffectively, which usually implies poor spatial locality.

TABLE A

| Applications C# | Pages touched per interval | Average Page Density |
| --- | --- | --- |
| TestApplication1 | 600 | 7.7% |
| TestApplication2 | 588 | 6.5% |
| Xam1ParserTest | 602 | 6.0% |
| SatSolver | 1703 | 28% |

Exemplary System

In one example, a copying generational garbage collector is optimized to increase data locality. For example, the method may be employed using a virtual machine with memory management including garbage collection. In this example, the system is agnostic with respect to most other details of a virtual machine.

Figure 7:
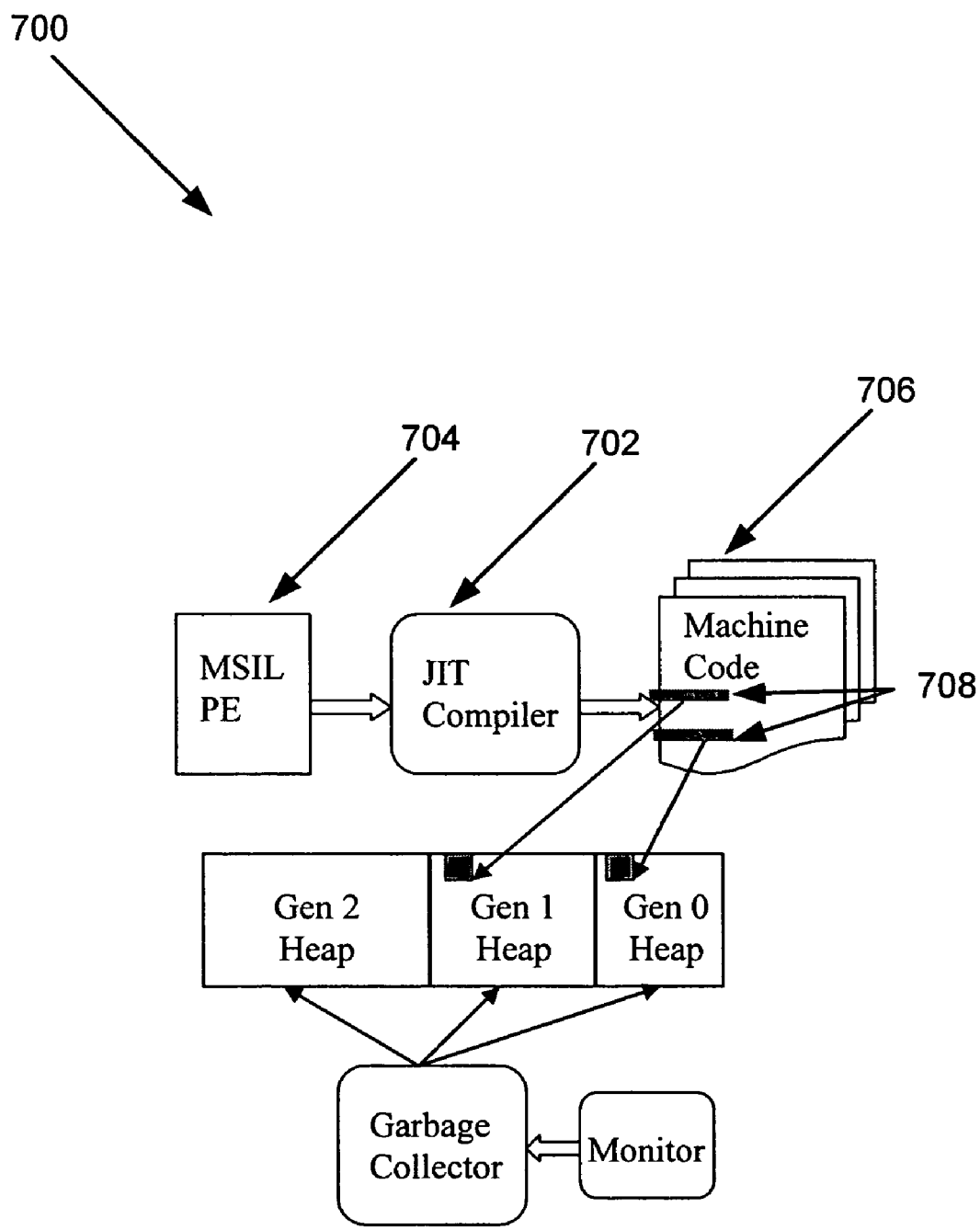
FIG. 7 is a block diagram of an exemplary system for optimizing data locality of the heap utilizing garbage collection.

FIG. 7 illustrates an architectural overview 700 of one possible embodiment of the system. A just-in-time (JIT) compiler 702 is configured to take an intermediate language representation 704 (e.g., MSIL) and compile it into machine code 706 for a particular architecture. The JIT compiler can be modified to insert lightweight instrumentation in the compiled code. The instrumented code 708 marks objects that have been recently accessed. Monitoring code can be inserted in the runtime (e.g., common language runtime (CLR) or Java runtime) to gather metrics while the application is running. The monitoring code can use the monitoring data and heuristics to trigger GC-for-locality. During GC-for-locality, objects that have been marked as recently accessed (hot) can be identified and co-located on pages separate from the rest of the heap. The GC-for-locality can be triggered independently of a normal GC, which is triggered upon detection of memory pressure.

Exemplary Page Versus Cache Optimization

When arranging data for locality, two options are to either optimize for page locality or optimize for cache locality.

In one example, increasing page densities for data pages may be advantageous. For example, it may be cheaper to collect profile information for page optimization. Since pages (typically 4 KB) are several orders of magnitude larger than cache lines (typically 64-128 bytes), one does not need to get precise temporal sequences of data accesses in order to do efficient packing. One can afford to pack data more loosely since the "bin" sizes are larger. Note that by simply increasing page densities, one similarly increases the chances of packing data for better cache utilization (by removing cold intervening objects). This results in significant cache benefits for many programs, effectively as a free side effect of page optimization.

Additionally, the cost of page faults and TLB misses is usually much higher than L2 cache misses. So the potential savings of page optimization may be greater than cache optimization. Of course, this works both ways—a single hot object on a cold page may cause that page to be faulted in, and thus wipe out most of the benefits of the optimization. Therefore, it may be useful to ensure that there is good coverage of the hot data set.

In some cases, L2 caches are typically indexed on physical memory addresses, not virtual addresses (e.g. this is true on all x86 architectures). So if a page entry is missing in the TLB, then it may not help much to have the data in the L2 cache.

Exemplary Instrumentation Model

To improve page densities rather than cache utilization, one need not determine precise temporal affinity between data elements. Instead, in some embodiments it may suffice to simply record objects that are frequently accessed between triggered dynamic optimizations or during a time interval. These accessed objects (e.g., objects, methods, procedures, data structures, etc.) are then considered hot. During optimization hot objects are grouped onto a page (or a set of pages) in a section of the heap.

In one example, a counter is used to decide which objects are hot. In another example, a compiler (or JIT compiler) is used to insert read barriers for certain critical instructions that access heap data. In one such example, the read barrier code may consist of a single call instruction to a helper routine which updates the counter if it is not set. Write barriers can be automatically generated by the compiler to support the generational GC, and can be modified to insert a conditional update of the counter.

In one such example, the system includes an implementation of a counter, an implementation of a read barrier, and instrumentation of objects (e.g., operations that read/write to heap) so that reads and/or writes are counted.

The object reference counter can be implemented in different ways. For example, the object reference counter may be embedded in the object. In another example, the object reference counter may be implemented as a separate table. In another example, a 1-bit counter is used that is embedded in the object. In such an example, if an object is touched a bit is set to reflect that the object has been touched at least once during an interval. In another example, several bits corresponding to an object can function as a counter reflecting how many times an object is touched during the interval. In one such example, each touch is added to the counter corresponding to the touched object. A threshold number of touches establishes whether an object is hot or not. One or more touches in an interval can be used to identify a hot object. Hot objects may also include objects instantiated (created) during the interval. The bit(s) corresponding to an object may be stored in the object itself or elsewhere. If the counter corresponding to an object is outside the object, preferably it is in a location that can be accessed rapidly since the overhead of counting should be minimized.

In another example, the counter (one or more bits) is stored in the object itself. For example, the CLR has a four byte object header for each object that can be used for various purposes (e.g. to implement a lightweight lock). In some embodiments it may be possible to use one or more of these 32 bits for the counter (or for the hot bit).

Table B is sample code for one example of read barrier code. For example, profiling code can be used to mark accessed objects. In this example, rg is the register that holds the object address, and the object header is at offset −4 from the start of the object. OBJECT_ACCESSED_BIT is a bit mask used to set a single bit in the object header.

TABLE B

```
test dword ptr[rg-4], OBJECT_ACCESSED_BIT
jnz Bit_set
lock or dword ptr[rg-4], OBJECT_ACCESSED_BIT; atomic update
Bit_set:
ret
```

In one such example, an interlocked operation is used to set the bit since the object header could be concurrently modified by other threads (e.g. when taking a lock on the object). The interlocked operation may be expensive on x86 architectures (e.g., 20-30 clock cycles). In addition, it may dirty a cache line during a read operation that could hurt scalability of applications on multi-processors. Therefore, in another example, a conditional read barrier may be used instead of an unconditional one, even though the conditional read barrier increases the size of the read barrier code. In another example, in order to reduce the size of the increased code, the read barrier is not in-lined. Instead, the read barrier code is implemented as a helper routine (e.g., one for each register).

In another example, an optimizing algorithm reduces the number of read barriers and increases performance and/or reduces the amount of added code. In one example, the read barrier employed is different from normal access barriers in that a call to it is not inserted at every access point. For example, calls to the read barrier code could be exposed to the common sub-expression elimination (CSE) optimization. In another example, since occurrences of exceptions are rare, no profiling calls are inserted into exception handling code. Similarly, another example ignores constructors that are not in-lined.

Further, it is desirable to consider when to reset the counter (or hot bit). In one example, when the counter is embed the in the object, the counter bit(s) cannot be cheaply cleared without scanning all live objects. In one such example, the counter is cleared while objects are traversed during garbage collection (GC). In another example, the counter is cleared every time a hot object is encountered during a GC-for-locality.

In one example with copying generational garbage collection, clearing the counter during GC-for-locality works well for objects in lower generations where garbage collection happens more frequently and cheaply. Since higher generations are collected less often, the reference bit may get stale over time. Thus, in one alternative, it is better to provide a way to clear the counter without traversing the reachability graph or the entire heap. For example, a card table (corresponding to objects) is used that allows one to clear the counters without having to rely on a full traversal of the reachability graph or the entire heap. In another example, a hot bit table or a hot bit field corresponding to a page and/or the heap helps reduce time to clear counters/bits.

Exemplary Sampling

In one example, the instrumentation model described above has low overhead and is adequate enough to speed up overall performance. However, there are several scenarios where dynamic heap reorganization may not significantly improve the performance of an application (e.g., if the dataset is small enough to fit in the available memory). For such applications, the cost of the instrumented code (e.g., the read barrier) can be too high (in some cases degrading the application by as much as 40%).

To further reduce the instrumentation overhead, one example only profiles the code intermittently. For example, if a method is instrumented with profiling read barriers, then a second copy of the method may be generated which doesn't have the instrumentation. During profiling (i.e., monitoring, sampling, etc.) the instrumented version is used. During normal operation, the method without the instrumentation is utilized. The prolog of each method is extended to perform a check and transfer control to either the instrumented or the non-instrumented version of the method. In some embodiments, back edges are not modified. Surprisingly, this simplification may not reduce the effectiveness of this approach (e.g., on the benchmarks below—except for some synthetic ones that have long-running hot loops). As a further optimization, the two copies may be placed in two separate code heaps.

There are a number of factors that can be varied to control sampling. For example, how often to use instrumented versions of the code, and how long to use the instrumented version once sampling begins. By tuning these two parameters, one can obtain useful profile information at a reasonably low profiling overhead.

In one example, the normal version of code is run normally, and the instrumented version of the code is run for short periods of time, and only periodically. For example, the instrumented code is run for 10 milliseconds, every ten thousand milliseconds. This will produce information about what objects are touched during the periodic sampling period. This information is used to pack the hot page.

Exemplary Heap Reorganization

The CLR GC implements a variation of the generational mark-compact garbage collector and divides the small object heap into three generations. In one example, heap reorganization for locality may be limited to generations greater than 0. One rationale for not doing heap reorganization during a generation 0 collection is that most of those generation 0 objects have been recently allocated. Since they have been recently allocated, they are already in the cache or working set, and are thus unlikely to benefit much from locality improvements. In one embodiment, during GC, the system identifies all objects that were a) marked as hot since the previous locality collection and b) belong to a generation that is equal or lower to the generation being collected. In this example, only these objects are candidates for locality optimization. After all the candidate objects having been identified, the locality optimization can decide how they should be laid out and then where hot objects should be placed back onto the GC heap.

In one example, the hot object layout is done using two copying phases. First, the hot objects are copied out of the heap into a temporary buffer according to a hierarchical decomposition order (e.g., if a hot object contains pointers to other hot objects, these hot objects are grouped together) so that some cache locality benefits can be obtained along with the page locality benefits, at no extra overhead. The original locations are marked free and reclaimed by the collector. Second, the well-rearranged aggregation of hot objects may then be placed back at the younger end of the heap. In another example, double copying is avoided (e.g., by reserving a designated section of the heap). In another example, the layout does not mix objects from different generations.

Placing congregation of hot objects at the younger end of the heap has a few potential advantages. For example, it is likely to have enough space there to accommodate the assemblage of hot objects. Additionally, it is better not to promote objects adventitiously, because it is more expensive to collect an older generation than a younger one. Finally, some longer-lived objects tend to die right after being re-used, and demoting may accelerate the reclamation of the space occupied by these objects. Depending on the embodiment, demoting many objects may not be good. However, it may still be performed selectively for hot objects (which comprise a small fraction of the heap). Additionally, it is important not to create too many cross-generational pointers.

Exemplary Optimization Triggering Policy

Another consideration is determining when to trigger optimization for locality. Additionally, determining when triggering for locality optimization is not working so that it is not fruitlessly continued when it is having reduced net performance benefits.

There are several possibilities or combinations for determining when to trigger for locality optimization. In one example, hardware performance counters are monitored to determine rates of DTLB and L2 cache misses. During an increase of misses, optimization for locality is triggered.

In another example, rates of memory pressured GC collections are monitored. In such a case, a hot object locality optimization is performed every $2^{nd}$, $3^{rd}$, ... $N^{th}$, memory triggered collection. In some examples, it is beneficial to perform a locality optimization on every memory pressure triggered GC.

In another example, rates of object allocation are monitored. When there is a significant decrease in allocations of new objects, the application is assumed to be reusing instead of allocating new objects. Once allocation rates drop and become relatively stable, optimization for locality is triggered.

In other example, it can be beneficial to look at reference counts in objects. A high reference count for objects indicates the same objects are being touched over and over again, optimization may prove beneficial. However, if reference counts are low, then optimization is less likely to prove beneficial since the processor is not requesting the same objects over and over again.

In another example, both allocation rates and performance counters are monitored. While allocation rates increase and are high, no optimization is performed. But once allocation rates drop and get relatively stable, the data structures for the program are likely set up and it is more likely that objects will be repeatedly accessed, creating the opportunity to benefit from locality optimization. Additionally, once allocation rates are lower and relatively stable, a high rate of DTLB or L2 cache misses as indicated by the performance counter is likely to provide a good trigger for optimization. Since new allocations are low, the DTLB and L2 cache misses indicate that blocks are moving in and out of RAM and cache rapidly, and congregating hot objects is likely to reduce overall DTLB and L2 cache misses.

In another example, optimization for data locality could be triggered at regular or varied intervals. In another example, if a previous optimization showed low performance improvements (e.g., same DTLB miss rates after optimization, etc.) and the interval between optimizations is too small, the interval before a next optimization could be increased. If a previous optimization improves DTLB cache miss rates more than a threshold and the interval is too big, the next optimization might be triggered sooner.

Combinations of these heuristics are also possible. One drawback with the performance counters approach is that they are usually not virtualized to a process (i.e., they are counting globally), so the numbers could be skewed by other applications running on the system. However, they do have the benefit that they have no additional costs on some chips. They are counted in parallel with the processing. In some embodiments, the rate of allocation may be a pretty reliable measure for triggering locality optimization.

In one example, it is beneficial to monitor the benefits of doing the optimization. For example, performance counters are used to measure miss rates for data TLB and L2 caches after an optimization. If the data TLB or cache miss rates do not improve according to some relative baseline, it may be desirable to discontinue or reduce triggering GC for locality, for some period of time, or until the results show that the benefits justify the costs.

Thus, anything that directly or indirectly triggers the reorganization of the heap for clustering accessed objects is considered program behavior. When a monitored program behavior indicates, the heap is reorganized (e.g., clustered). One or more of the monitored program behavior indicators can trigger a heap reorganization of live-hot objects.

Exemplary Increased Rates of GC

Much of the literature on triggering GC for memory pressure focuses on reducing the number of GC collections because of the added high costs of GC collections. Instead, the described methods and systems indicate that more GC collections, when augmented by the locality optimization, may increase overall performance even when the number of GC collections increase. In one example (XamlParserTest as described below), GC collections are increased by as much as 50% and overall performance still improves.

Exemplary Performance Counters

Some processors provide various versions of performance counters. In one example, a performance counter provides a way of determining what objects were touched (e.g., the IA64 processor). In this example, the code may not need to be instrumented. The performance counters indicate what objects (e.g., addresses in the heap) were touched during a period or since the counters were reset. This would be beneficial since the operations touching the heap would not need to be instrumented to identify hot objects. For example, TLB miss addresses could be provided via this instruction.

Additionally, instructions are rumored to be introduced soon that will record whenever objects in memory are accessed (e.g., read/write). These addresses or objects will be recorded to an internal circular buffer and made available.

These accessed objects provide the information needed to create the hot page(s).

Exemplary Clustering

Allocated objects are "live" but only recently accessed live objects are also "hot". Historically, hot objects were not known or considered when performing garbage collection. Live objects were compacted and dead objects (e.g., de-allocated or released objects) were collected for new free space during garbage collection. Using the described technologies, even without requiring garbage collection, the live-hot objects are clustered together on the heap. Interestingly, not all accessed objects need to be placed in the same area of the heap in order for this technology to provide substantial benefits. For example, if a sampling period is used to monitor accessed objects and set access bits, then only objects accessed during the sampling period will be placed in a hot cluster on the heap. Thus, one or more clusters on the heap do not need to include all recently accessed objects in order to be within the scope of this technology. Additionally, even when object access monitoring is continuous (as compared to periodic sampling periods, or otherwise), not all accessed objects need to be placed in the same cluster to obtain significant benefits from the described technology. For example, if two clusters are created anywhere in the heap, then having the hot objects in two (or even several locations) instead of spread all over pages of the heap will provide significant benefits. Thus, clustering live-hot objects on the heap in one or more locations of significantly higher concentrations of hot-live objects is contemplated. Of course, if the hot objects are placed in a single cluster of close proximity, this will likely provide even better results. For example, a cluster that fit within a page of the heap might be considered ideal, but certainly not necessary. In another example, if a working set of hot objects is large enough to occupy plural pages on the heap, it may be beneficial if those plural pages are placed near each other, but not required. In another example, it is helpful if the cache is large enough to receive a cluster of hot objects. In such an example, if a working set of hot objects occupies plural clusters, then whenever one of the clusters is brought into cache, there is a probability that other hot objects in that cluster will be accessed soon. Additionally, swapping higher probability clusters in and out of cache is likely to require few swaps, regardless of where each individual hot cluster is contained on the heap. All of these ideas contemplate clustering recently accessed objects. Finally, clustering in the proximity of recently allocated objects provides additional benefits. For example, in a generational garbage collection heap, clustering near the youngest generation of the heap is helpful because newly allocated objects are also generally hotter than older objects.

Exemplary Benchmarks

In one example, experimental results were observed. A prototype triggered GC heap reorganization of hot objects and the reorganization provided beneficial results in performance. The prototype utilized was a workstation version of the commercial CLR implementation with concurrent GC disabled on the Windows XP operating system. The experiments were performed on several machines with different configurations of memory, cache sizes, and CPU speeds. GC for locality improved performance best on machines with smaller L2 cache and memory, which is not surprising.

Four micro-benchmarks were created and two applications written in C# were obtained for the analysis. The four micro-benchmarks (i.e., Tree, Array, SList and Hashtable) were written to test performance enhancements of GC for locality. The micro-benchmarks create the respective data structure from a large number of randomly generated data interleaved with some garbage data. The benchmarks repeatedly search for a set of data after a training loop and a forced GC. One test application called "XamlParserTest" reads from an XAML file three times to measure the performance of different components of the parser. XAML (extensible application markup language) is based on XML. The input file used contains a simple but 11000-level deeply nested node. Another application called "SAT Solver" is a SAT solver converted into C# from its C++ implementation. The input file describes a problem instance with 24640 3250-variable CNFs (conjunctive normal form).

Exemplary Performance Results

The execution times for the benchmarks are illustrated in Table C. For all four micro-benchmarks that were created, the optimization performs as well as expected. However, for the two benchmarks that were obtained, the performance of GC for locality improves XamlParserTest substantially and improves SAT Solver only a little. Performance benefits are reduced in pointer intensive applications. In such an example, the overhead of garbage collection itself is already too high, accounting for about one-sixth to one-third of the execution time, even without optimization (i.e., monitoring and reorganizing hot objects during GC).

TABLE C

|  | Orig (sec) | Opt (sec) | improvement |
|---|---|---|---|
| XamlParserTest | 117.98 | 66.25 | 43.8% |
| SAT solver | 138.00 | 132.50 | 4.0% |
| Tree | 4.20 | 3.16 | 24.8% |
| Array | 17.58 | 7.53 | 57.2% |
| Slist | 11.93 | 8.80 | 26.3% |
| Hashtable | 6.67 | 3.28 | 50.8% |

Exemplary Profiling Overhead

Instrumentation overhead may vary depending on whether an always-on approach or sampling approach is taken. Table D compares the profiling overheads between the always-on and sampling approaches. The sampling makes the profiling overhead acceptable for the optimization.

TABLE D

|  |  | Always-on profiling | | Sampling | |
|---|---|---|---|---|---|
|  | Orig (sec) | time (sec) | slowdown | time (sec) | slowdown |
| XamlParserTest | 117.98 | 123.10 | 4.3% | 119.66 | 1.4% |
| SAT solver | 138.00 | 204.90 | 48.5% | 138.90 | 0.7% |
| Max | 97.70 | 115.80 | 18.5% | 98.30 | 0.6% |
| GenIBC | 6.50 | 7.70 | 18.5% | 6.90 | 6.2% |
| Tree | 4.20 | 5.30 | 26.2% | 4.40 | 4.8% |
| Array | 17.58 | 20.03 | 13.9% | 17.98 | 2.3% |
| List | 11.93 | 14.90 | 24.9% | 12.53 | 5.0% |
| Hashtable | 6.67 | 7.26 | 8.8% | 6.81 | 2.1% |

Exemplary Page Density Improvement

Table E indicates the average number of pages accessed per interval and average page density, with and without optimization (i.e., triggering GC for reorganizing hot objects onto a page(s)). It was measured by collecting traces of memory references, dividing the execution into 1000000-reference intervals (for hashtable micro-benchmark, each interval contains 10000000 references), and computing the number of pages accessed per interval and percentage of data actually accessed on each page for the last 1000 intervals. In general, by packing objects according to the program's access pattern, the optimization may reduce the working set and may increase the "useful" data on each page. For SAT Solver, the number of pages accessed per interval increases with the optimization because the optimization involves many more GCs, each of which scans portions or the whole heap, and the computation does not exclude accesses made by the garbage collector.

TABLE E

| Application | Pages touched per interval (orig) | Average Page Density (orig) | Pages touched per interval (opt) | Average Page Density (opt) |
|---|---|---|---|---|
| XamlParserTest | 602 | 6.0% | 258 | 17.8% |
| SAT Solver | 1703 | 28.0% | 1736 | 32.9% |
| Tree | 2566 | 13.2% | 1922 | 26.8% |
| Array | 1996 | 16.2% | 808 | 21.0% |
| Slist | 672 | 17.8% | 240 | 53.6% |
| Hashtable | 336 | 5.9% | 253 | 18.3% |

Exemplary Locality Improvement

In order to verify the optimization's improvement on the working set and page density, data was also collected on the number of DTLB misses, as shown in Table F. As a result of the improvement on the working set and page density, the optimization also reduces the number of DTLB misses. Also shown in Table F are the numbers of L2 cache misses for the benchmarks. Although the optimization does not center on cache locality, it does very well in improving cache locality.

TABLE F

|  | DTLB | | | L2 Cache | | |
| --- | --- | --- | --- | --- | --- | --- |
|  | Orig | Opt | Improvement | Orig | Opt | Improvement |
| Xam1ParserTest | 262178 | 71125 | 72.9% | 1269248 | 30787 | 97.6% |
| SAT solver | 1594246 | 1452614 | 8.9% | 1189753 | 1049775 | 11.8% |
| Tree | 112636 | 58435 | 48.1% | 40696 | 39493 | 3.0% |
| Array | 1172048 | 521741 | 55.5% | 173048 | 9268 | 94.6% |
| Slist | 999362 | 173410 | 82.6% | 265106 | 98713 | 62.8% |
| Hashtable | 72176 | 48266 | 33.1% | 36570 | 23714 | 35.2% |

Exemplary Computing Environment

Figure 8:
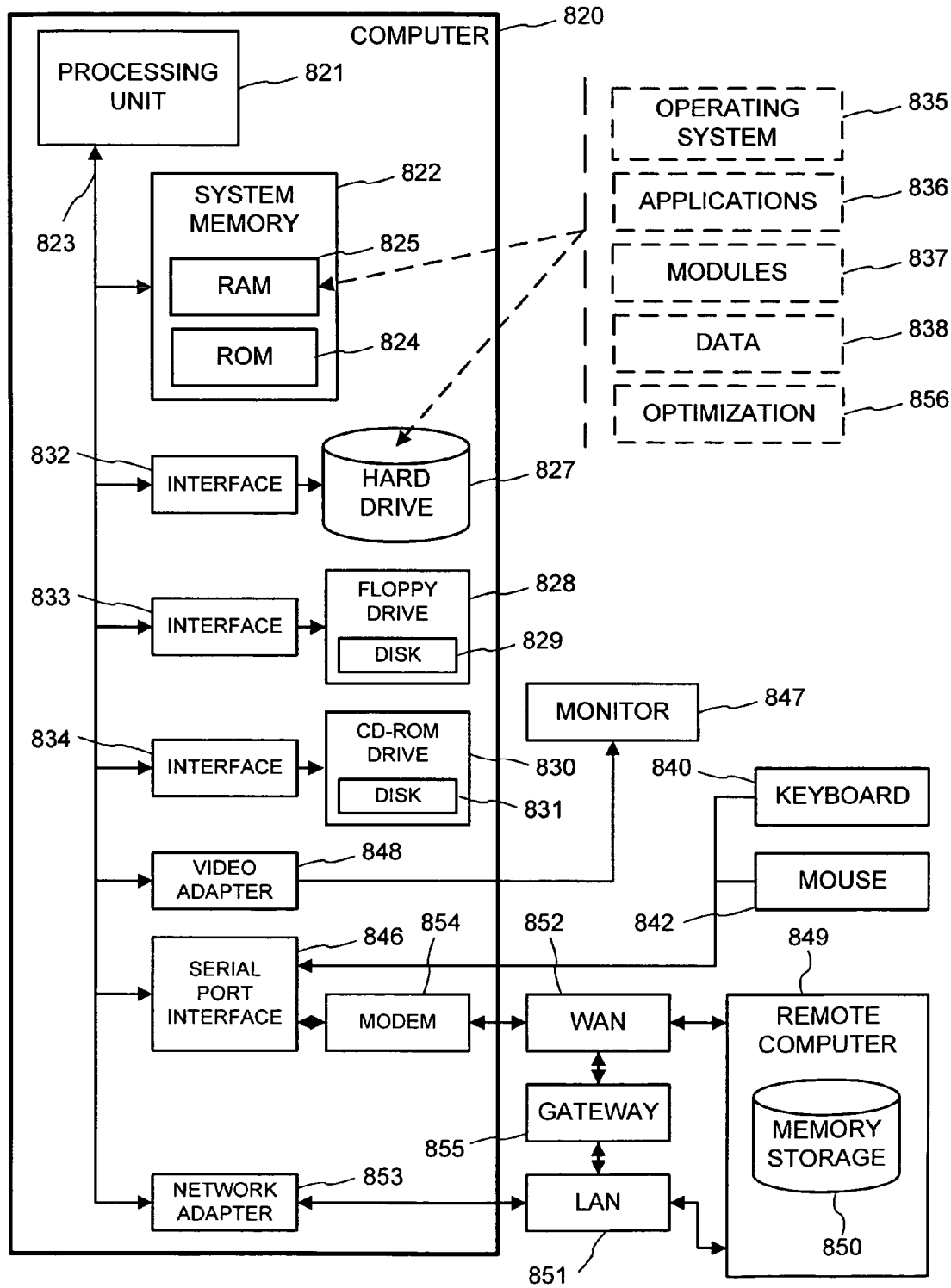
FIG. 8 is a block diagram of a distributed computer system implementing the described technologies.

FIG. 8 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 8, an exemplary system for implementation includes a conventional computer 820 (such as personal computers, laptops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; SPARC from Sun and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838; in addition to an implementation of the described monitoring and optimizations 856.

A user may enter commands and information into the computer 820 through a keyboard 840 and pointing device, such as a mouse 842. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated. The logical connections depicted include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computing devices may be used, wireless or otherwise.

Alternatives

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A computerized method comprising:
  monitoring an executing program in order to determine which of a plurality of objects in a heap are recently accessed by the executing program;
  upon determining that a heap object was accessed by the executing program, manipulating at least one bit within a heap object to indicate the recent heap object access;
  monitoring a program performance metric which measures performance or behavior of the program while the program is running in order to determine when to perform a heap optimization;
  invoking the heap optimization based upon the monitored program performance metric; and
  performing the heap optimization comprising
    traversing the heap to identify the recently accessed heap objects as indicated by the manipulated at least one bit within accessed heap objects,
    clustering the recently accessed heap objects in memory by temporarily copying the recently accessed heap objects out of the heap rearranged according to a hierarchical decomposition order and locating the rearranged recently accessed heap objects at a younger end of a generational garbage collected heap, and
    resetting the manipulated at least one bit for each accessed heap object, wherein the at least one bit then representing recent accesses by the executing program since a last performed heap optimization.

2. The method of claim 1, wherein the at least one bit is a plural bit counter, and the manipulation increments the plural bit counter.

3. The method of claim 1, performed by a virtual machine.

4. The method of claim 1, wherein the at least one bit is located in a header of the accessed heap object.

5. The method of claim 1, wherein the hierarchical decomposition order arranges the recently accessed heap objects such that, if a first recently accessed heap object contains pointers to a second recently accessed heap object, then the first and second recently accessed heap objects are grouped together within a cluster.

6. The method of claim 1, wherein the clustered accessed heap objects comprise one or more pages of heap memory.

7. The method of claim 1, wherein the clustered heap accessed objects comprise plural contiguous pages of heap memory.

8. The method of claim 1, wherein the program performance metric comprises a performance counter.

9. The method of claim 1, wherein the program performance metric comprises an Nth memory pressure garbage collection.

10. The method of claim 1, wherein the program performance metric comprises an allocation rate.

11. The method of claim 1, wherein the program performance metric comprises object reference counters.

12. The method of claim 1, wherein the program performance metric comprises a compilation of plural performance indicators.

13. The method of claim 1, wherein monitoring the program performance metric in order to determine when to perform the heap optimization further comprises monitoring two or more program performance metrics.

14. A computer system comprising:
  memory and a central processing unit; and
  optimization modules for monitoring and optimizing a heap for a monitored program, the optimization modules comprising,
    an instrumentation module for instrumenting the monitored program to record heap objects accessed by the monitored program during the monitored program's execution, the instrumentation module including program code for setting a bit within an accessed heap object to record an access, and for monitoring a program performance metric which measures performance or behavior of the program while the program is running in order to determine when to trigger heap optimization,
    heap optimization module comprising program code for traversing the heap to identify heap objects recently accessed as indicated by the set bit recorded within accessed heap objects, for clustering recently recorded accessed heap objects in memory by temporarily copying the recently accessed heap objects out of the heap rearranged according to a hierarchical decomposition order and locating the rearranged recently accessed heap objects at a younger end of a generational garbage collected heap, and for resetting set bits, wherein subsequent setting of a bit by the instrumentation code represents recent access of the heap object since heap optimization.

15. The computer system of claim 14, wherein the monitored program performance metric comprises a data translation look aside buffer cache miss rate.

16. The computer system of claim 14, wherein the monitored program performance metric comprises an L2 cache miss rate.

17. The computer system of claim 14, wherein the monitored program performance metric comprises an allocation rate.

18. The compute system of claim 14, wherein the instrumentation module comprises a just-in-time compiler.

19. The computer system of claim 14 wherein a recently accessed object that points to another recently accessed object is placed near that object in the cluster.

20. The computer system of claim 14, wherein the heap optimization module further comprises code for determining that the clustered recently recorded accessed heap objects occupy more memory than a single page of memory will hold, so excess recently accessed objects are flowed into a cluster of a second page.

21. A computer-readable medium having thereon computer-executable instructions comprising:
instructions for instrumenting an application to record heap object accesses made by the application during execution, the access of a heap object recorded as one or more manipulated bits within an accessed heap object;
instructions for monitoring a program performance metric which indicates performance or behavior of the application during execution;
instructions for invoking heap optimization instructions based on a monitored performance of the application during execution; and
the heap optimization instructions comprising instructions for identifying heap objects recently accessed as heap objects including one or more manipulated bits, for temporarily copying recently accessed heap objects out of the heap rearranged according to a hierarchical decomposition order and locating the rearranged recently accessed heap objects at a younger end of a generational garbage collected heap, and for resetting one or more manipulated bits within recently accessed heap objects, wherein subsequent manipulation of the bits by the instrumenting instructions represent recent accesses of the heap objects since a last invocation of the heap optimization instructions.

22. The computer-readable medium of claim 21, further comprising instructions for instrumenting a heap object to count how many times it is accessed between heap optimizations.

23. The computer-readable medium of claim 21, further comprising instructions for instrumenting heap object to set a bit within its header when a data field in the heap object is accessed.

24. A computer system for improving data locality for an application, the computer system comprising:
a memory;
a processing unit;
a just in time compiler resident in the memory and executing on the processing unit, the just in time compiler being configured to take an intermediate language representation of the application and compile it into machine code for a particular architecture, wherein the just in time compiler is configured to generate instrumented code, wherein the instrumented code is configured to mark heap objects that have been recently accessed since a previous collocating of recently accessed heap objects; and
monitoring code resident in the memory and executing on the processing unit, the monitoring code being configured to gather metrics while the application is running, wherein the monitoring code is configured to monitor the marked heap objects and trigger garbage collection for locality, wherein the garbage collection for locality is triggered independently of garbage collections triggered as a result of a fragmentation level threshold and comprises:
collocating heap objects that have been marked as recently accessed on separate pages from the rest of the heap by temporarily copying the recently accessed heap objects out of the heap rearranged according to a hierarchical decomposition order, and locating the rearranged recently accessed heap objects at a younger end of a generational garbage collected heap; and
resetting the marks on the heap objects, wherein subsequently marking heap objects by the instrumented code represents recent accesses by the executing program since said collocating heap objects.

25. The computer system of claim 24, wherein the instrumented code is configured to mark the heap objects by updating object reference counters that are embedded in the heap objects.

26. The computer system of claim 24, wherein the instrumented code is configured to mark the heap objects by updating object reference counters that are stored in a table separate from the objects.

27. The computer system of claim 24, wherein the just in time compiler generates profiling read barriers in methods having critical instructions that access heap data.

28. The computer system of claim 24, wherein the just in time compiler generates two versions of methods wherein the first version of the method and the second version of the method are placed in separate code heaps.

* * * * *